Oct. 17, 1961  D. K. STUDENICK  3,004,431
MAXIMUM DEPTH RECORDER
Filed Jan. 17, 1961  5 Sheets-Sheet 1

INVENTOR.
DAVID K. STUDENICK
BY W. O. Quesenberry
D. E. Hodges
ATTYS.

Oct. 17, 1961 D. K. STUDENICK 3,004,431
MAXIMUM DEPTH RECORDER
Filed Jan. 17, 1961 5 Sheets-Sheet 2

INVENTOR.
DAVID K. STUDENICK

BY
ATTYS.

INVENTOR.
DAVID K. STUDENICK

Oct. 17, 1961 D. K. STUDENICK 3,004,431
MAXIMUM DEPTH RECORDER
Filed Jan. 17, 1961 5 Sheets-Sheet 4

INVENTOR.
DAVID K. STUDENICK
BY W. B. Quesenberry
D. Hodges
ATTYS.

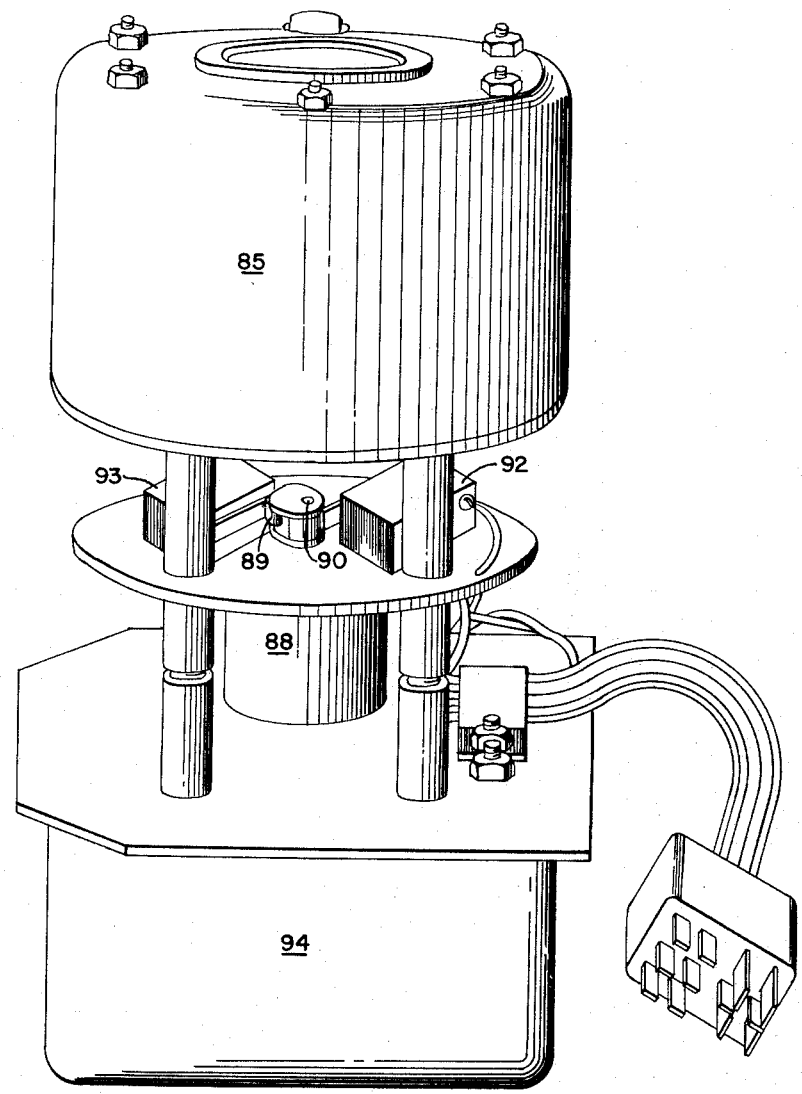

United States Patent Office 3,004,431
Patented Oct. 17, 1961

3,004,431
MAXIMUM DEPTH RECORDER
David K. Studenick, Beltsville, Md., assignor to the United States of America as represented by the Secretary of the Navy
Filed Jan. 17, 1961, Ser. No. 83,350
6 Claims. (Cl. 73—301)
(Granted under Title 35, U.S. Code (1952), sec. 266)

The invention described herein may be manufactured and used by or for the Government of the United States of America for governmental purposes without the payment of any royalties thereon or therefor.

The present invention relates in general to a depth indicating device and more particularly to a device for recording the depth below the water surface at a particular time after submergence of the object to which it is attached.

In devices of this character heretofore devised it has been the usual practice to employ such items as charts, a Fathometer, or sounding line to determine the depth of the object below the water surface. These methods were utilized with some degree of success but were considered bulky, unwieldy and not always accurate. A chart, for example, was not accurate enough because local bottom variations were not known. A Fathometer was both inaccurate and too cumbersome for field use. The sounding line is accurate at shallow depths but become unwieldy at the greater depths. In addition, the sounding may be taken at one point and the object under test may be shifted to a different depth of water while being placed in position.

The general purpose of this invention is to provide an accurate depth indicating device which may be attached to an object under test and which will visually indicate reliably the depth of water in which the object under test has in fact been submerged.

An object of the present invention is to provide a new and improved depth indicating device capable of being attached to an object under test.

Another object is to provide a new and improved depth indicating device for automatically recording the water depth to which the device has been submerged.

A further object is to provide a new and improved depth indicating device for automatically recording, at a predetermined time, the water depth of the device when submerged.

Still another object is to provide a new and improved depth indicating device for automatically recording on a counter at a predetermined time the water depth in feet to which the device has been submerged.

A further object is to provide a new and improved method of obtaining the depth below the surface of the water of a particular submerged object at a particular time.

Other objects and many attendant advantages of this invention will be readily appreciated as the same becomes better understood by reference to the following detailed description when considered in connection with the accompanying drawings in which like reference numerals designate like parts throughout the figures thereof and wherein:

FIG. 7 is a perspective view of the clock, motor and switches housed in the second portion of the housing.

Figure 1:
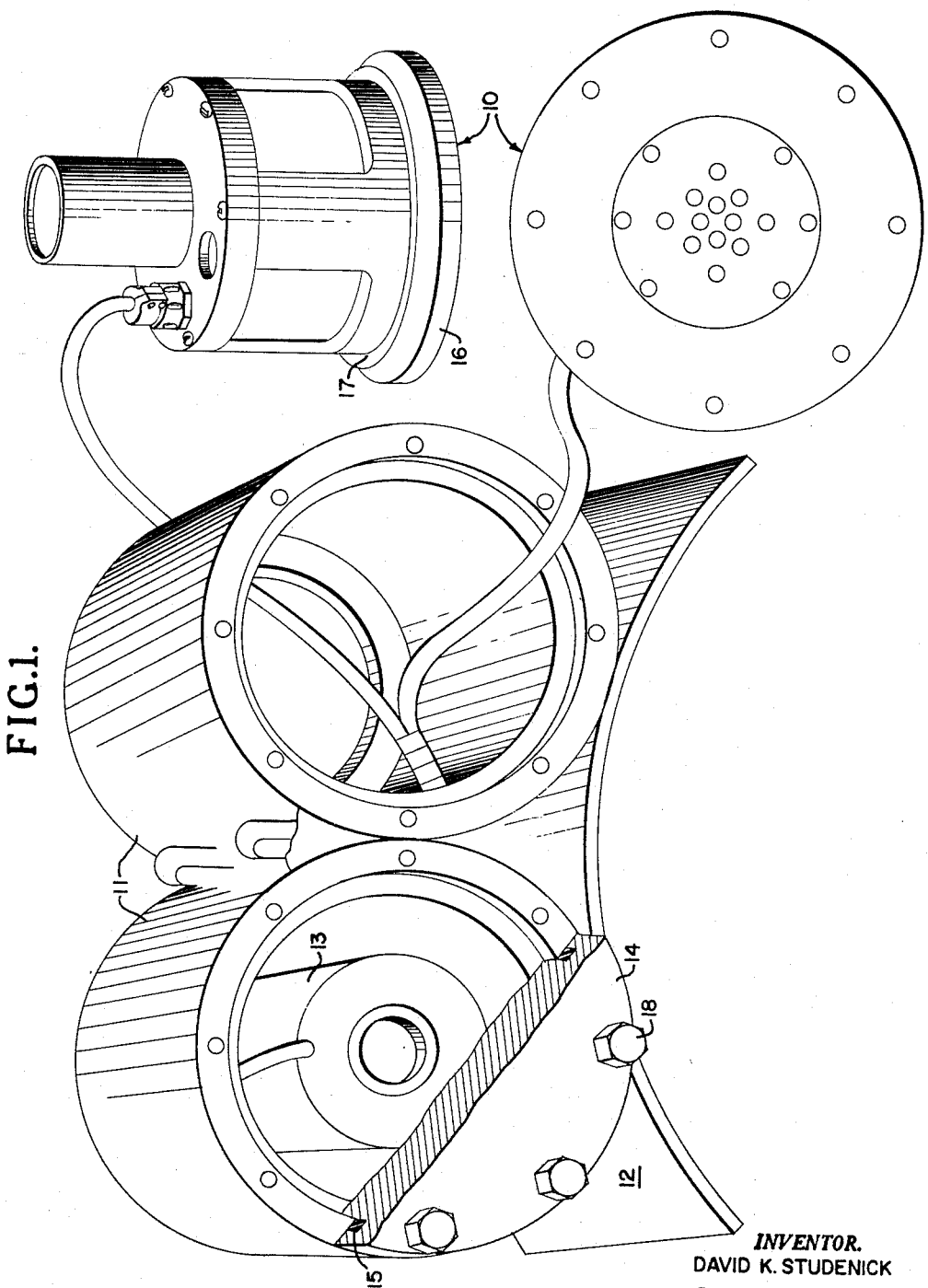
FIG. 1 is a perspective view of applicant's device showing the depth sensing units removed from the housing and the clock mechanism mounted in the housing.
Figure 2:
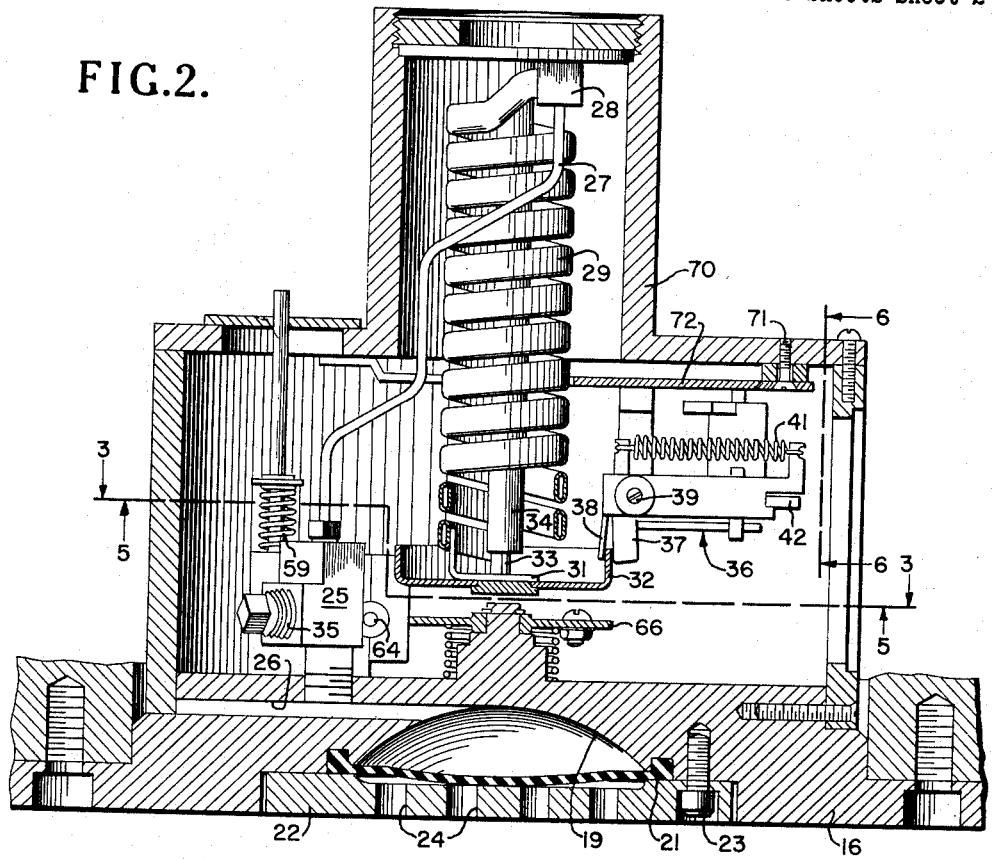
FIG. 2 is a sectional view of one of the depth sensing mechanisms of FIG. 1.

Referring now to the drawings for a more complete understanding of the invention on which like numerals of reference are employed to designate like parts throughout the several views and more particularly to FIG. 1 thereof, there is shown thereon a pair of depth sensing mechanisms indicated generally by the numeral 10 and a pair of cylindrical casings 11 connected together and mounted on base plate 12. The mechanical mechanism 13 is mounted in one of the casings which has a cover plate 14 and a water tight seal 15 for maintaining the mechanism air tight. The depth sensing units 10 are mounted on a cover plate 16 with a water tight seal 17 for maintaining the units in an air tight chamber when secured in place in any suitable manner, as illustrated by bolts 18. The cover plate 16, as shown in FIG. 2, has a recessed chamber 19 filled with an incompressible fluid which is covered with a flexible diaphragm 21 and which is secured in place by the plate 22 and bolts 23. The plate is provided with a plurality of apertures 24 for establishing communication between the exterior surface of the diaphragm and the surrounding water when the device has been immersed therein. The recessed chamber 19 is in communication with a T fitting 25, through a duct 26 which is provided for this purpose. The T fitting 25 is threadably secured to the base plate in a manner well known in the art. The T fitting is connected by tubing 27 to a hollow support 28. Also secured to hollow support 28 is one end of a Bourdon tube 29, the other end of which is sealed and secured by member 31 to a cup-shaped element 32. The cup-shaped element 32 has a pin 33 coaxially secured thereto and rotatable therewith within a complementary bore formed within the support 34. The cup-shaped element 32 is rotatable about the support 34 variably in accordance with the degree of pressure of the fluid within the Bourdon tube. The T fitting 25 is provided with a plug 35 for filling the fluid system. The system comprises the recess, the chamber 19, duct 26, tubing 27 and the interior of the Bourdon tube. The fluid system is completely filled with a liquid such, for example, as light oil. The filled system is responsive to slight inward movements of diaphragm 21 in response to outside hydrostatic pressure applied thereto. This pressure is translated into corresponding angular displacements of the cup-shaped element 32.

Figure 6:
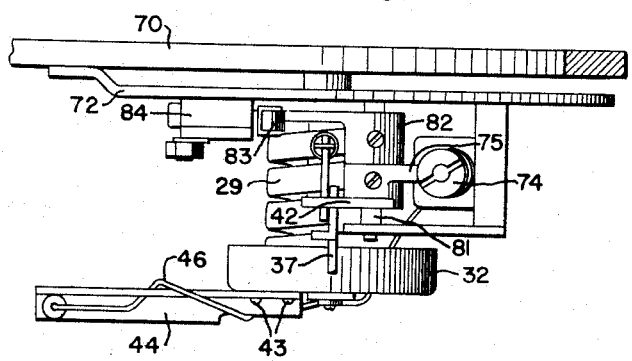
FIG. 6 is a view taken substantially along line 6—6 of FIG. 2.

There is also provided a locking clamp 36 comprising two movable members 37 and 38 pivoted at 39 and normally urged toward a clamping position by spring 41. Each of the members 37 and 38 is normally maintained in an unlocked position by member 42 engaging complementry notches formed in each of the members. When member 42 is removed from the notches of members 37 and 38, element 32 is clamped in a sationary position as will be more fully described hereinafter. Suitably secured to the cup-shaped element 32, as by rivets 43, is a contact arm 44, as shown in FIG. 6. The end portion of contact arm 44 has a contact 45 secured thereto to which an external electrical connection is completed by way of conductor 46.

Figure 3:
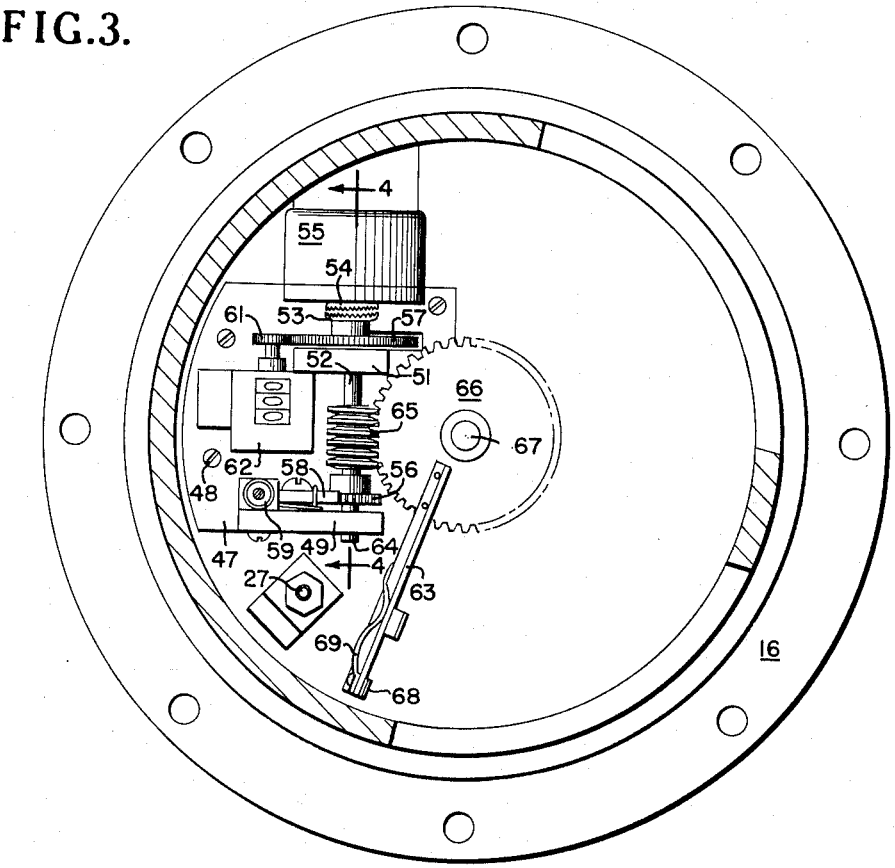
FIG. 3 is a view taken along line 3—3 of FIG. 2.
Figure 4:
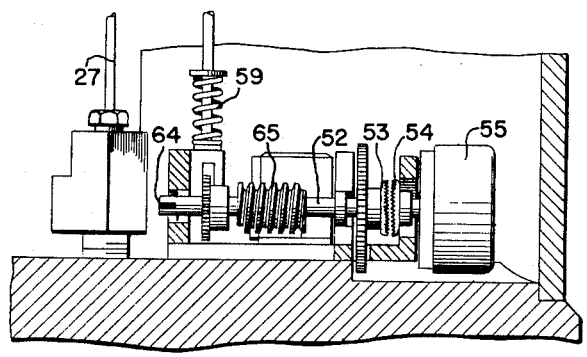
FIG. 4 is a view of the impulse control mechanism for actuating the counter.

Referring now to FIG. 3, the cover plate 16 has a plate 47, secured thereto as by screws 48 for carrying a pair of bearing members 49 and 51 within which is journaled a shaft 52. Shaft 52 is connected at one end thereof to a ratchet wheel 53, the complementry ratchet wheel 54 being secured to and operated by a solenoid type motor 55. The solenoid motor may be of any type suitable for the purpose, for example, as a type known in the art as "Ledex." The solenoid motor operates to engage the ratchet wheels 53 and 54 and advance ratchet wheel 53 one tooth for each impulse applied thereto. On the other end of shaft 52 is attached a ratchet pinion 56 engaged by a pawl 58 urged thereagainst in a suitable manner, for example, by a spring not shown. There is also secured to the shaft 52 a gear 57 in meshing engagement with gear 61. Gear 61 is secured to the shaft of counter 62 in such manner that the counter is actuated to a setting corresponding to the degree of rotation of shaft 52. The counter 62 has a zero setting thereof corresponding to an initial position or setting of contact arm 63. The end of shaft 52 is slotted or otherwise formed as at 64 in FIG. 4 to receive a tool by means of which the shaft and contact arm 63 may be turned at will to a zero setting. The ratio of gears 57 and 61 are proportioned so that each rotation by the solenoid results in one revolution of the counter, which represents a two foot measurement on the counter. Thus, the counter is read directly in feet.

There is also fixed on shaft 52 a worm gear 65 in meshing engagement with gear 66 mounted for rotary movement on shaft 67. Secured to the gear 66 in any suitable manner as by rivets is contact arm 63; having a contact 68 carried thereon to which is connected conductor 69 for establishing an external circuit. The contact arms 44 and 63 being independently movably about a common axis.

Figure 5:
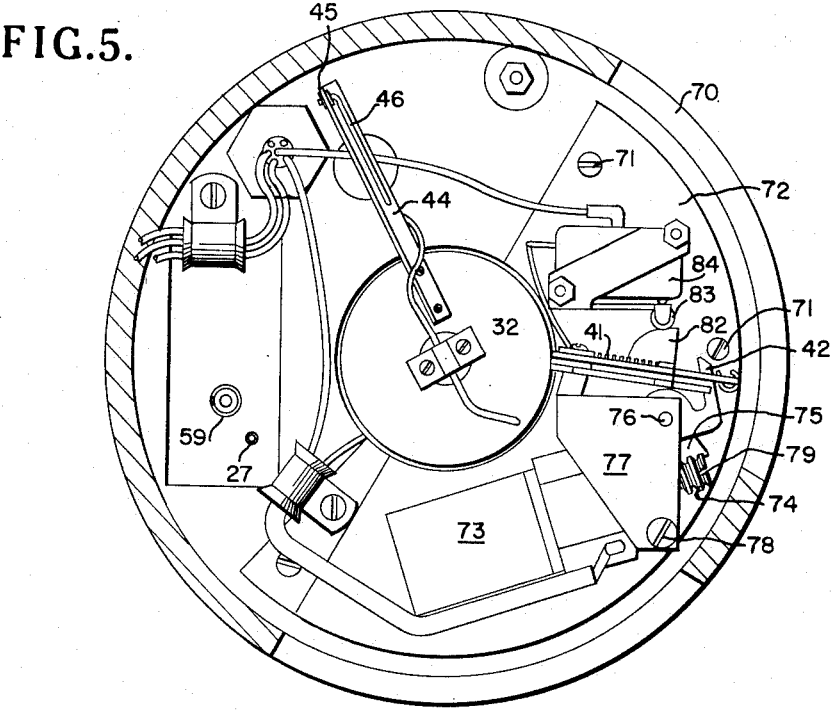
FIG. 5 is a view taken along line 5—5 of FIG. 2.

There is secured to hood plate 70 as by screws 71, FIG. 5, a plate 72 on which is secured a motor 73. The motor 73 has a worm gear 74 secured to the shaft thereof. The worm gear 74 is in threaded engagement with an arcuate member 75 pivoted about shaft 76. Shaft 76 is held in place by plates 72 and 77. Plate 77 being secured in place by bolt 78 and an additional bolt not shown. The arcuate member 75 has secured thereto in any suitable manner, the arm 42 aforesaid. The cup-shaped member 32 being locked by members 37 and 38 as member 42 is withdrawn from the notched portion thereof in response to actuation of motor 73. Gear 74 is provided with a slotted portion 79 to receive a suitable tool whereby motor 73 may be set manually to a desired initial position such that the cup-shaped member 32 is normally unlocked. The arcuate member 75 and locking member 42 are both carried on shaft 76 and secured thereto, as shown in FIG. 6.

On shaft 76 is also secured a cam member 82 adapted to engage roller 83 of microswitch 84, FIG. 5, for maintaining the switch in a closed position until cam member 82 is disengaged from the roller. The cam member 82 will disengage and open the switch when members 37 and 38 are unlatched by member 42. When switch 84 is opened, the operating circuit of motor 73 is interrupted.

Both of the depth sensing units operate identically, and the reading of each counter is averaged to obtain the final depth.

Figure 8:
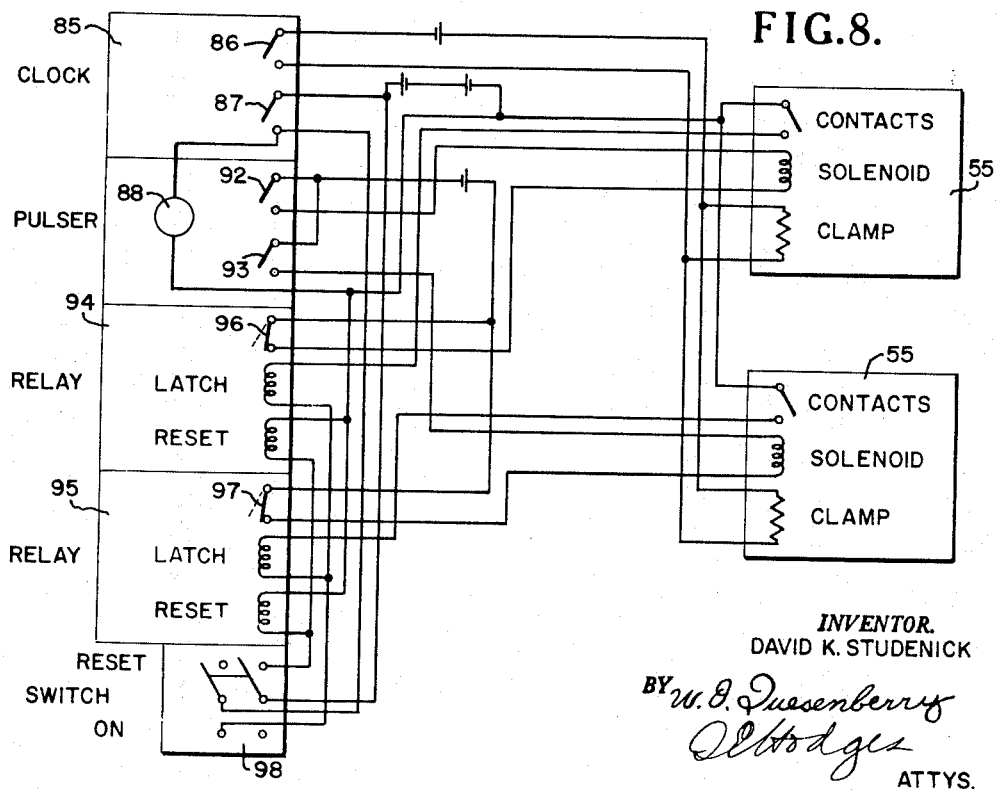
FIG. 8 is a schematic view of the electrical circuitry of the invention.

In the second portion of housing 11 is located a time delay hand wound clock 85, shown in FIGS. 7 and 8 which operates a pair of switches 86 and 87. The time delay clock may be set to close the two switches after a suitable time delay such as one or two hours, if desired.

Referring to FIG. 8, the clock closes switch 86 which energizes the clamping circuit thereby effecting the clamping of element 32 in place. The time delay clock then closes switch 87 which energizes the constant speed motor 88. This motor has a cam 89 secured to the motor shaft 90 in such a manner that switches 92 and 93 close and open with each rotation of the motor. As each switch makes contact, the appropriate solenoid connected thereto is energized. When contacts 45 and 68 make contact relays 94 and 95 are energized thereby opening normally closed switches 96 and 97 which opens the circuit to the appropriate solenoids.

The initial adjustment of the depth sensing unit will now be described. Prior to inserting the device in the water the device is prepared for operation by resetting the drive mechanism so the counter reads zero. The clamping members 37 and 38 are checked to be certain that the sensing element 29 and cup 32 is free to move and the clamp is ready for operation. The clock is wound and connected to the power supply. The relay switch 98 is pushed to "reset" and then to the "on" position thereby closing normally closed switches 96 and 97. The device is now assembled and fastened to a unit to be tested.

As the device descends, the pressure sensing units rotate the movable contact arm, an amount proportional to the pressure exerted by the water.

The clock first closes switch 86 which operates the clamping device in the depth sensing unit as described herein. A short time later the clock closes switch 87 to start the constant speed motor 88 which actuates switches 92 and 93. These switches alternately close and open thereby actuating each of the solenoid drive mechanisms 55 in the depth sensing device. As the solenoids operate they cause contact arm 63 to rotate toward clamped arm 44. Counter 62 is geared to the drive mechanism and begins to record the number of motor actuations which represent the water depth in feet on the counter.

When the driven arm 63 makes contact with the pressure sensing arm 44, thereby closing electrical contacts 68 and 45 to energize latching relays 94 and 95. The operations of relays 94 and 95 open normal closed switches 96 and 97 to deenergize drive mechanisms 55. The reading on the counter at this point represents the water depth in feet at which the unit is located.

Applicant's device is a small compact unit that may be readily attached to any unit designed for under water use. Applicant's device accurately determines the distance below the surface of the water the unit is located at the time the device is operated. This novel device is capable of accurate measurements over a wide range of water depths.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for measuring water depth at a predetermined time comprising a casing capable of withstanding water pressure at various depths, depth sensing means located in said casing for sensing the water pressure as the device is submerged below the water surface, a time delay switching circuit means for connecting circuit components together in a predetermined time sequence, a source of power connected to said time delay switching means for energizing the various circuit components; means energized by said switching means for clamping said depth sensing means in an existing position at a predetermined time, solenoid motor means for rotating a contact means from a present position to a final position in contact with said depth sensing means whereupon the circuit to the solenoid motor means is opened, and means for recording the rotation of said solenoid motor means, whereby the depth below the water surface is indicated.

2. A depth sensing device capable of recording the water depth of a submerged device to which it is attached comprising a casing for attachment to the submerged device, a pressure sensing means located in said casing means having an initial position and rotatable to a final position determined by the water pressure wherein it resides, a source of power, a time delay switching means connected to said source of power for energizing electrical components in a predetermined order, means for clamping the pressure sensing means in the final position when energized by said source of power through said switching means, depth recording means rotatable from a first position to a final position, the first position being settable at will and the final position being in contact with said pressure sensing means, said depth recording means being energized by said time delay switching means and being deenergized upon contact with the pressure sensing means, and visual indicating means connected to said recording means for visually recording the water depth at which the pressure sensing mans was clamped.

3. The method of determining the depth below the water surface a device has been submerged comprising the following steps: rotating a pressure sensing element in proportion to the pressure of the surrounding medium, clamping said pressure sensing element in place at a predetermined time, rotating a depth recording means by alternately energizing and deenergizing a solenoid motor until it makes contact with the pressure sensing element whereupon the solenoid motor is deenergized, and recording on a visual indicator which is connected to the solenoid motor, the number of movements of said motor whereby the number recorded on the visual indicator represents the depth of the submerged device.

4. A depth recording device for recording at a particular time, the particular depth the device is submerged below the water surface comprising a casing capable of withstanding substantial water pressure, at least one rotatable pressure sensing mans mounted in said housing for rotating from an initial position to a final position in proportion to the depth at which the device is submerged, a clamping circuit means for clamping the pressure sensing means in the final position, a power supply, a time delay means, said clamping means being connected to said power supply by said time delay means at a predetermined time, a depth recording means energized by said time delay means to rotate from an initial position to a final position into contact with said pressure sensing means for recording the depth the device is submerged below the water surface and relay means electrically connected to said depth recording means for deenergizing said recording means when said recording means makes contact with said pressure sensing means.

5. A depth recording device of claim 4 wherein the pressure sensing means includes Bourdon tube attached at one end, the unattached end of the Bourdon tube having a cup-shaped member attached thereto, an arm having one end attached to said cup-shaped member and an electrical contact located at the other end, a chamber located in said casing having one side made of flexible material exposed to an outside pressure, a connecting tube for joining the Bourdon tube with said chamber, an incompressible fluid completely filling said Bourdon tube said chamber and said connecting tube therebetween whereby when the chamber is subjected to an external pressure force this force is transmitted to the Bourdon tube by the fluid medium causing the unattached end of said Bourdon tube with said cup-shaped member and contact arm attached thereto to rotate in proportion to the pressure exerted on said chamber.

6. A depth recording device of claim 5 wherein the clamping means includes a stationary member located on the outside of said cup-shaped member, a movable member spring biased having a portion overhanging into the cup-shaped member in such manner that in the locking position the cup-shaped member is locked against the stationary member by the movable member, a rotatable blocking element normally maintaining the movable member in an unlock position, and motor means for rotating said rotatable blocking element from the normal position to said locking position.

References Cited in the file of this patent

UNITED STATES PATENTS

| | | |
|---|---|---|
| 2,265,098 | Beltis | Dec. 2, 1941 |
| 2,415,249 | Kothny | Feb. 4, 1947 |
| 2,818,731 | Whittaker | Jan. 7, 1958 |